UNITED STATES PATENT OFFICE.

WM. ZOLLICKOFFER, OF MIDDLEBURG, MARYLAND.

IMPROVED PROCESS OF BATING HIDES AND SKINS.

Specification forming part of Letters Patent No. 592, dated February 3, 1838.

*To all whom it may concern:*

Be it known that I, WILLIAM ZOLLICKOFFER, of Middleburg, in the county of Carroll and State of Maryland, have invented a new and useful Improvement for Bating All Kinds of Hides and Skins; and I do hereby declare that the following is a full and exact description.

The nature of my invention consists in using the muriate of ammonia as a bate for all kinds of hides and skins, either alone or in combination with either hens' dung, pigeons' dung, or dogs' dung, with which I bate them in a much shorter time than is required by using either of the three last-mentioned substances alone.

To enable others skilled in the art to make and use my invention, I will proceed to describe the manner of using it and its operation.

When I use the muriate of ammonia alone I take seven pounds, which I reduce to a coarse powder, and upon which I pour ten gallons of hot water in order to facilitate its solution. This solution I throw into a vat containing a sufficient quantity of clean water to cover five hundred pounds of hides or skins, dry weight, in a state of preparation for the bate. Into the bate I thus prepare I throw this quantity of hides or skins, with which I bate all kinds of skins in one hour, horse-hides in two hours, and ox-hides and other thick hides in three hours. The ox-hides and all other hides I handle once during their continuance in the bate in an hour after they have been placed into it. And when I use the muriate of ammonia in combination with either hens' dung, pigeons' dung, or dogs' dung I take two pounds and a half of the muriate of ammonia, which I dissolve in four gallons of hot water, after having previously reduced it to a coarse powder. This solution I throw into a vat containing the necessary quantity of either hens'-dung, pigeons'-dung, or dogs'-dung bate that is required for bating five hundred pounds of hides or skins, dry weight. Into the bate I thus prepare I throw this quantity of hides or skins in the usual state of preparation for undergoing the process, taking care, however, previously to place them into a pool of clear water for five minutes to wash off the dirt and lime. With this process I bate all kinds of skins in three hours, horse-hides in six hours, and ox-hides and other thick hides in nine hours. The ox-hides and other thick hides I handle three times, the end of the second, fourth, and sixth hour after they have been submitted to its operation. Horse-hides I handle twice, the end of the second and fourth hours; and all kinds of skins I handle once, the end of the first hour after. The hides and skins which are bated with this process are reduced and softened and in every way prepared for the bark analogous to those which are bated with either hens' dung, pigeons' dung, or dogs' dung alone, and the hair, dirt, and lime work out with equal ease. After they are bated with my process they are to be stoned or heated over the beam, like all other hides and skins.

What I claim as my invention, and desire to secure by Letters Patent, is—

The application of the muriate of ammonia as a bate for all kinds of hides and skins, either alone or in combination with either hens' dung, pigeons' dung, or dogs' dung, as herein described, using for that purpose any substance which will produce the intended effect.

WM. ZOLLICKOFFER.

Witnesses:
ELIAS HYTER,
DAVID MARTIN.